Jan. 21, 1936.  F. B. JOHN  2,028,546
SCREW DRIVER
Filed March 7, 1935
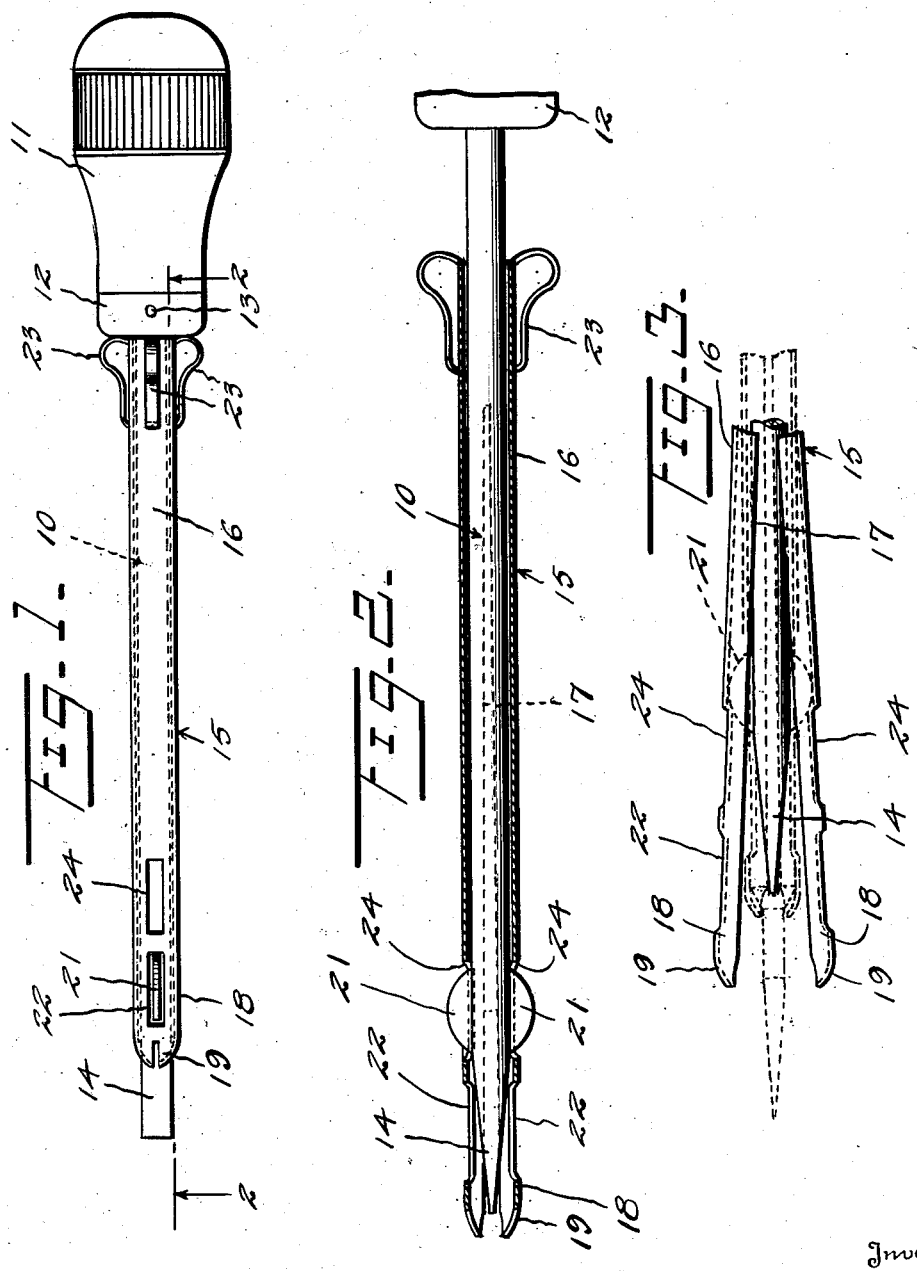
Inventor
F. B. John
By Watson E. Coleman
Attorney Patented Jan. 21, 1936

2,028,546

UNITED STATES PATENT OFFICE 2,028,546

SCREW DRIVER

Frank B. John, Nashville, Tenn., assignor of one-half to William A. Cox, Nashville, Tenn.

Application March 7, 1935, Serial No. 9,868

3 Claims. (Cl. 145—52)

This invention relates to screw drivers and more particularly to a screw driver having a screw clamping means thereon.

An object of this invention is to provide in a screw driver a means slidable longitudinally of the shank of the screw driver for detachably holding a screw on the bit of the screw driver so that screws may be inserted or removed from places where it is not possible to hold the screw with a hand.

Another object of this invention is to provide in combination with a screw driver a means movable longitudinally of the shank of the screw driver for grasping articles located in inconvenient places, such as screws, bolts, nuts or the like, irrespective of whether the articles are grasped on the end of the screw driver or are loose from the bit of the screw driver.

A further object of this invention is to provide in a screw driver a clamping means for the screw which is movable longitudinally of the shaft and which may be operated with the same hand that is turning the screw driver so that the screw may be gripped subsequent to the loosening of the screw from an article and before it is free of the article and may be released from the clamping means during the tightening of the screw after the screw has taken hold of the article.

The above and various other objects and advantages of this invention will in part be described and in part be understood from the following detailed description of the present preferred embodiment, the same being illustrated in the accompanying drawing wherein:

Figure 1 is a detail side elevation of a screw driver constructed according to the preferred embodiment of this invention.

Figure 2 is a sectional view taken on the line 2—2 of Figure 1.

Figure 3 is a fragmentary side elevation of the device showing the manner in which articles may be picked up by the screw holding means.

Referring to the drawing wherein like numerals of reference designate corresponding parts throughout the views, the numeral 10 designates generally the shank of a screw driver provided with a handle 11 secured to the shank 10 as by a pin 13 which extends through a ferrule 12 carried by the forward end of the handle 11. The forward end of the shank 10 is provided with a conventional bit or blade 14 which is adapted to engage in the kerf of the head of a screw.

In order to provide a means whereby a screw S may be detachably secured to the end of the blade or bit 14, I have provided a screw clamping means generally designated as 15 which is movable longitudinally of the shank 10. This clamping means 15 comprises an elongated tube 16 provided with diametrically opposed slits 17 which open through the forward end of the tube 16. The rear ends of the slits 17 terminate forwardly of the rear end of the tube 16. By partially splitting the tube 16 there are provided opposed screw clamping jaws 18, each of which is provided at the forward end thereof with concave inwardly extending gripping members 19. These gripping members 19, as shown in Figure 3, are adapted to engage beneath the head of the screw S so as to hold the head of the screw S against the blade 14 with the blade 14 engaged in the kerf of the screw S. The clamping members 18 are spread apart during the forward movement thereof by means of a pair of diametrically opposed cams 21 which are secured to the shank 10 rearwardly of the blade 14. The clamping members or jaws 18 are each provided with slots or elongated openings 22 and 24 within which the cams 21 engage for holding the clamping members 18 in either released or operative positions, respectively.

The rear end of the tube 16 is provided with operating members 23 extending outwardly of the periphery thereof, these operating members 23 being formed by striking a portion of the material of the tubes 16 and bending the material outwardly in the form of outwardly extending arms of suitable configuration so that the tube 16 may be readily moved forwardly or rearwardly as may be desired. This operation may be performed by the thumb engaging one or more of the operating members 23 and pressing against these operating members while moving the tube 16 longitudinally of the shank 10.

In the use and operation of this device when it is desired to use the screw driver comprising the shank 10, handle 11 and blade 14, without the use of the clamping members 18, these members 18 may be disposed rearwardly of the forward end of the blade 14 with the cam members 21 engaged in the forward slots 22. Where a screw is being removed from an article, the blade 14 may be initially engaged in the kerf of the screw and after the screw has been backed off a slight distance the tube 16 may be pushed forwardly and in this forward movement of the tube 16 the cams 21 will spread the two clamping members 18 apart until the cams 21 engage in a pair of rearwardly disposed slots 24. When the cams 21 are engaged in the rear slots 24, the screw engaging portions 19 of the clamping members 18 will be disposed about the head of the screw S and will hold the screw onto the blade 14. After the screw has been completely backed out of the article the screw driver with the screw S attached thereto may be drawn out of the opening so that the screw S will not be lost.

Where it is desired to pick up objects with this device the clamping members 18 can be moved forwardly so that they will extend beyond the forward end of the blade 14 and the sleeve 16 moved forwardly a sufficient distance so that the cams 21 will spread the clamping members 18 apart beyond the end of the blade 14. Due to the rounded edges of the cams 21, the clamping members 18 may be initially held in spread apart position and the two jaws 19 disposed on opposite sides of the article whereupon the shank 10 may be pushed forwardly, which movement will cause the clamping members 18 to automatically move rearwardly and to clamp about the sides of the article forwardly of the blade 14.

It will be obvious from the foregoing that the screw holding means mounted on the shank of the screw driver may also be used for the purpose of picking up small articles in out of the way places whether or not the articles have a kerf therein or have a head which might be engaged by the blade 14.

It is of course, understood that various changes and modifications may be made in the details of construction and design of the above specifically described embodiment of this invention without departing from the spirit thereof, such changes and modifications being restricted only by the scope of the following claims.

What is claimed is:—

1. A screw driver, comprising a shank, a handle secured to one end of the shank, a blade on the other end of the shank, a pair of yieldable article clamping members slidable on the shank and having a gripping means on the forward ends thereof, said clamping members having a plurality of longitudinally spaced openings therethrough, and a pair of opposed cams secured to the shank and engageable in a selected opening to hold the clamping members in either operative or inoperative position.

2. A screw driver as set forth, comprising a shank, a handle on one end of the shank, a blade on the other end of the shank, a tubular member slidable on the shank, a pair of yieldable clamping members carried by the tubular member, said clamping members each having a plurality of longitudinally spaced openings therein, and a pair of cams secured in opposed relation to the shank and engageable in the openings of the clamping members, said cams holding the tubular member and the clamping members in operative or inoperative position and also acting to spread the clamping members apart upon movement thereof into operative or inoperative position.

3. A screw driver as set forth, comprising a shank, a handle on one end of the shank, a blade on the other end of the shank, a tubular member slidable on the shank, a pair of yieldable clamping members integral with the tubular member and extending forwardly thereof, operating means for moving said tubular member longitudinally of the shank, each of said clamping members having a plurality of longitudinally spaced openings therethrough intermediate the ends thereof, and a pair of segmental cam members secured in opposed relation to the shank adjacent the forward end thereof, said cam members engageable in a selected opening for holding the clamping members in either operative or inoperative position, the rounded surface of said cam members moving said clamping members away from each other upon movement of the clamping members longitudinally of the shank until the cams register with a selected opening in the clamping members.

FRANK B. JOHN.